April 5, 1960     R. CHARCUSET ET AL     2,931,614
DEVICE FOR FILLING CONTAINERS WITH PREDETERMINED
QUANTITIES OF MATERIALS
Filed Aug. 14, 1956     5 Sheets-Sheet 2
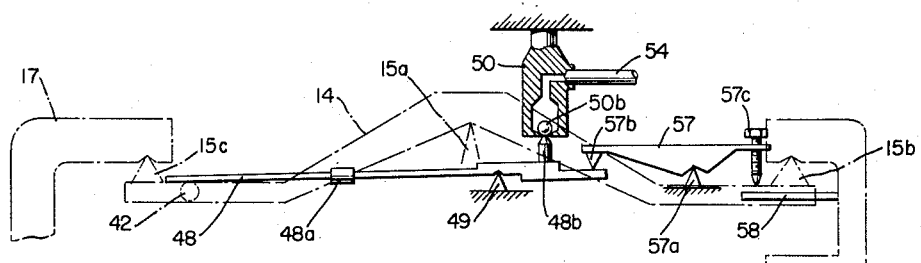
Fig. 11
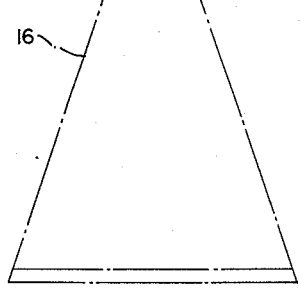
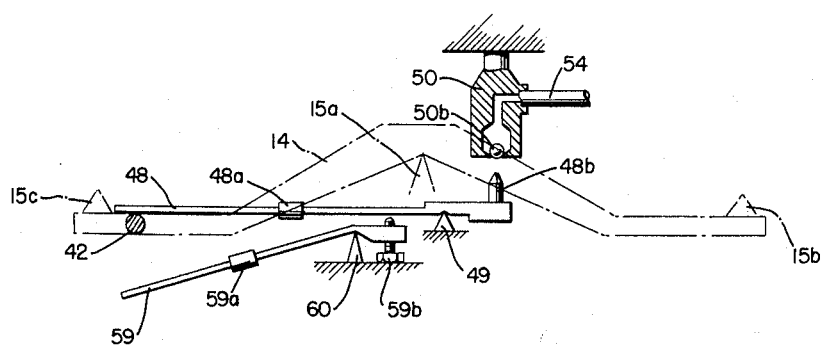
Fig. 12
*INVENTORS*
RAYMOND CHARCUSET
JEAN MOYRAND
BY
*Bauer and Seymour*
ATTORNEYS

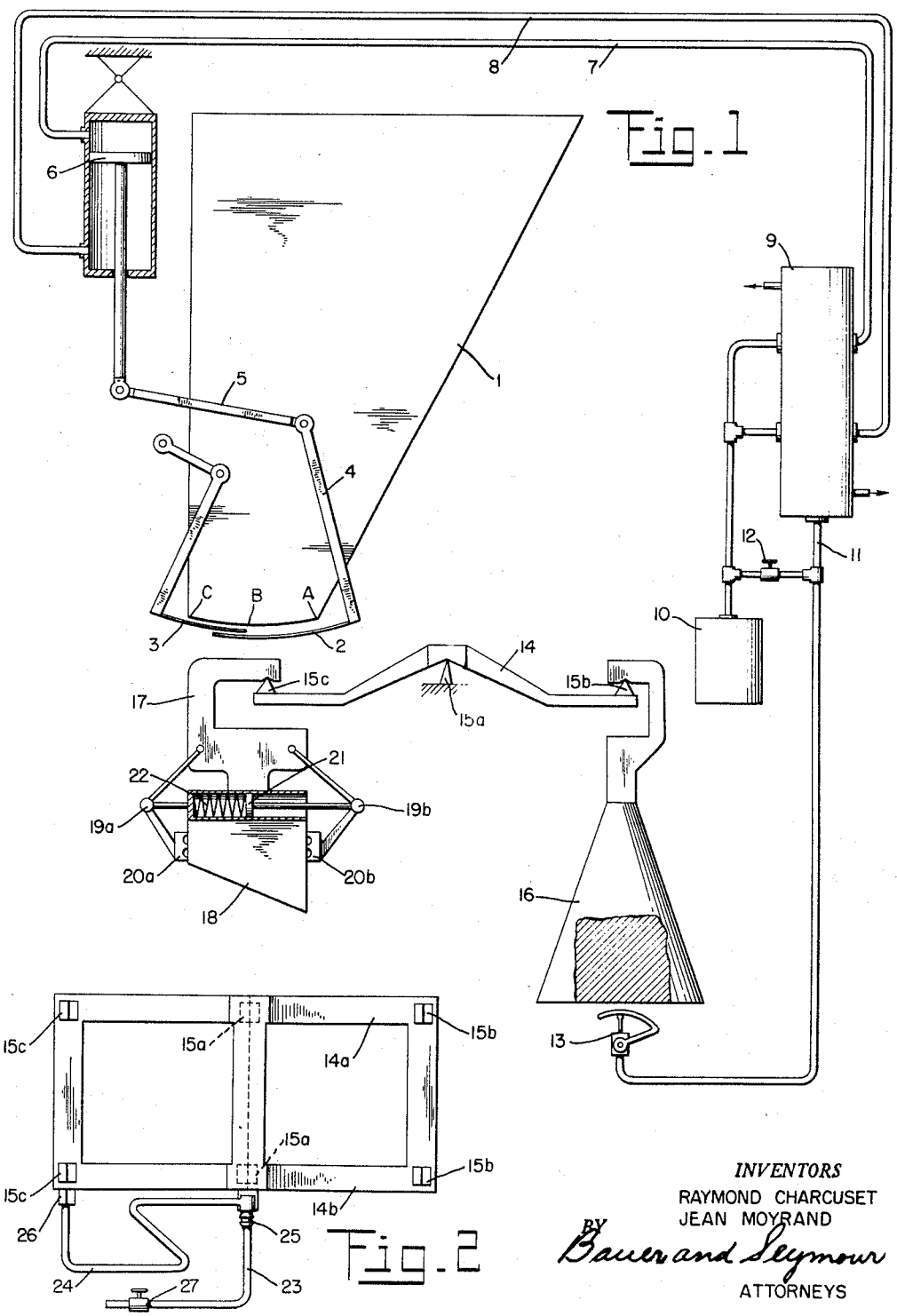

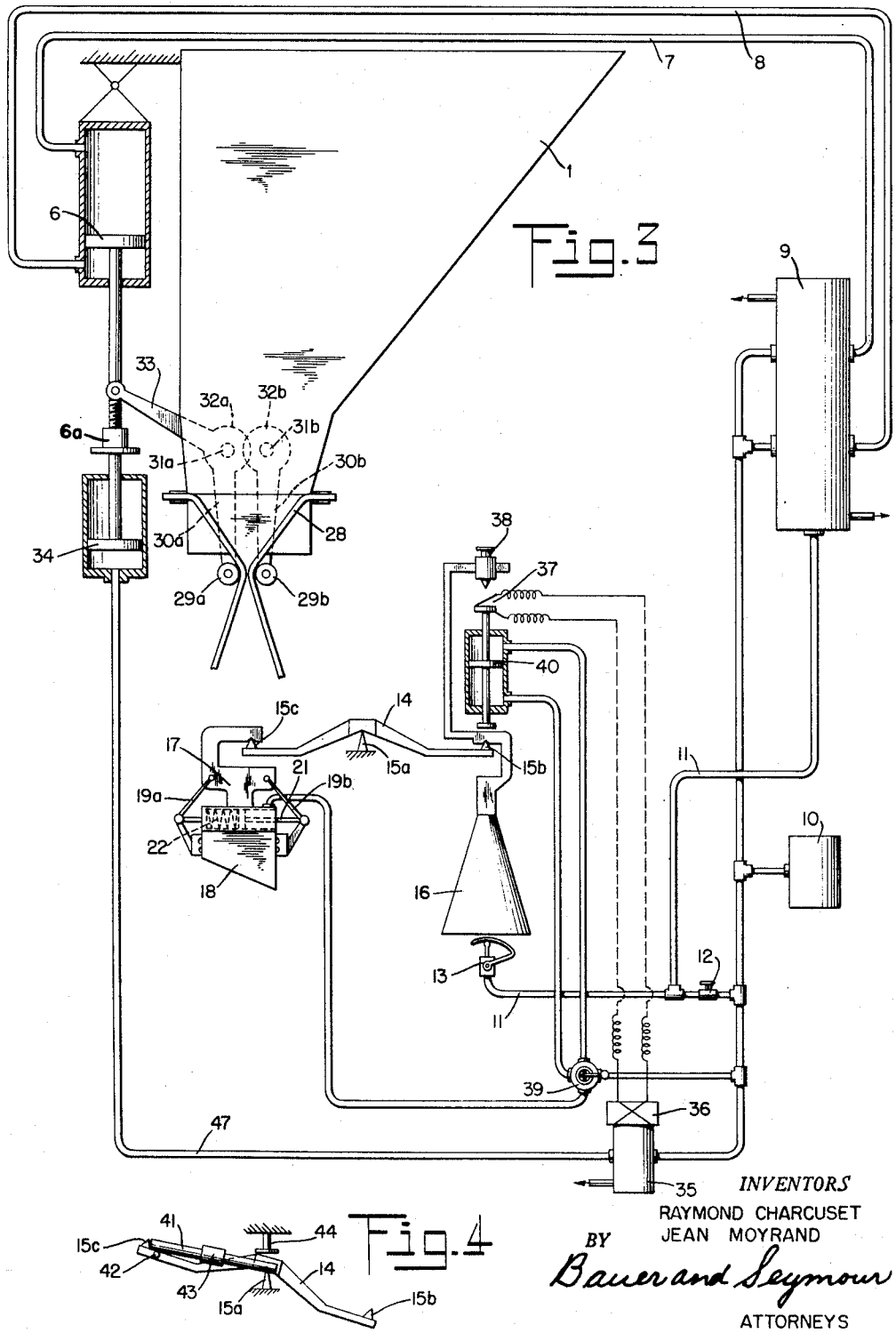

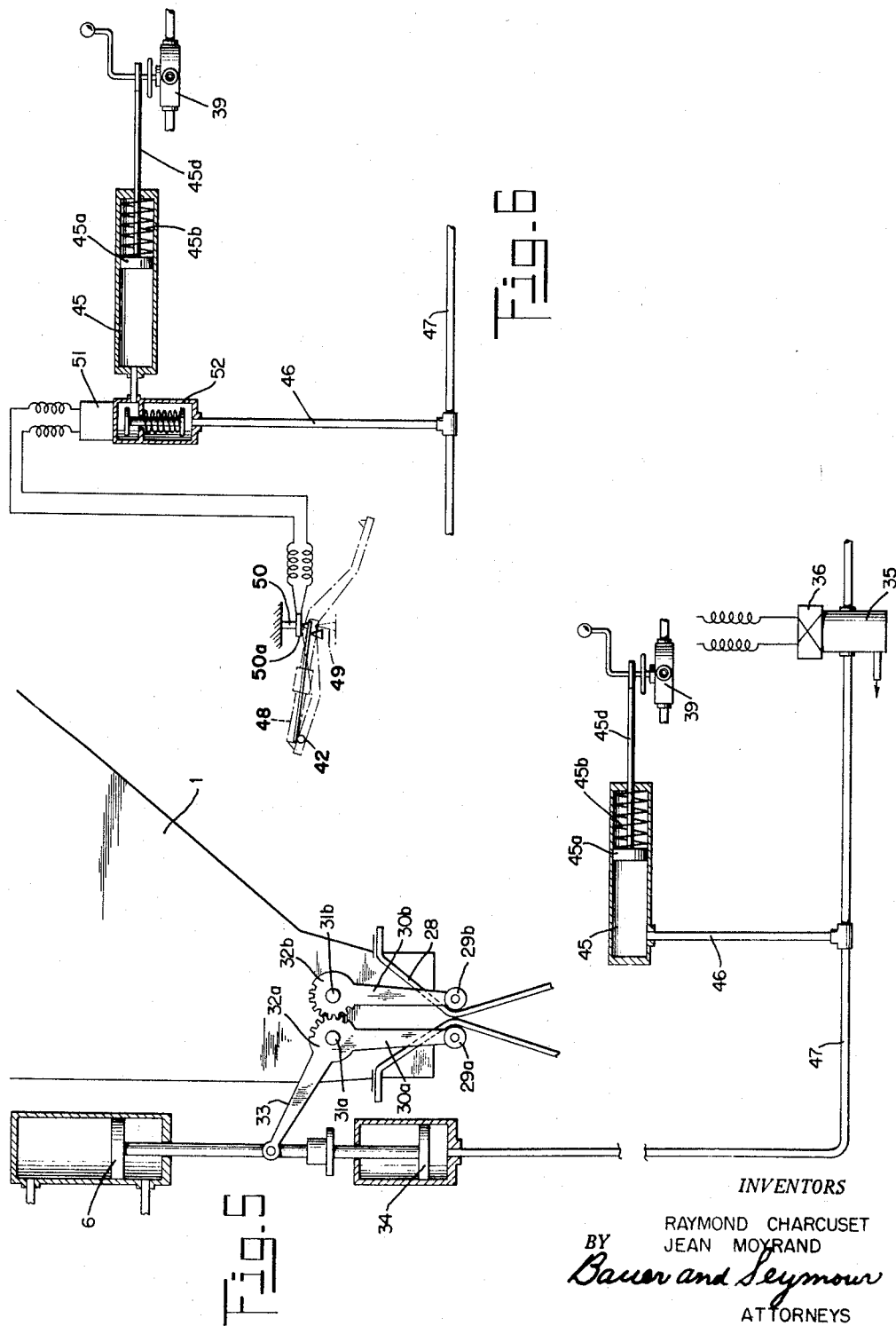

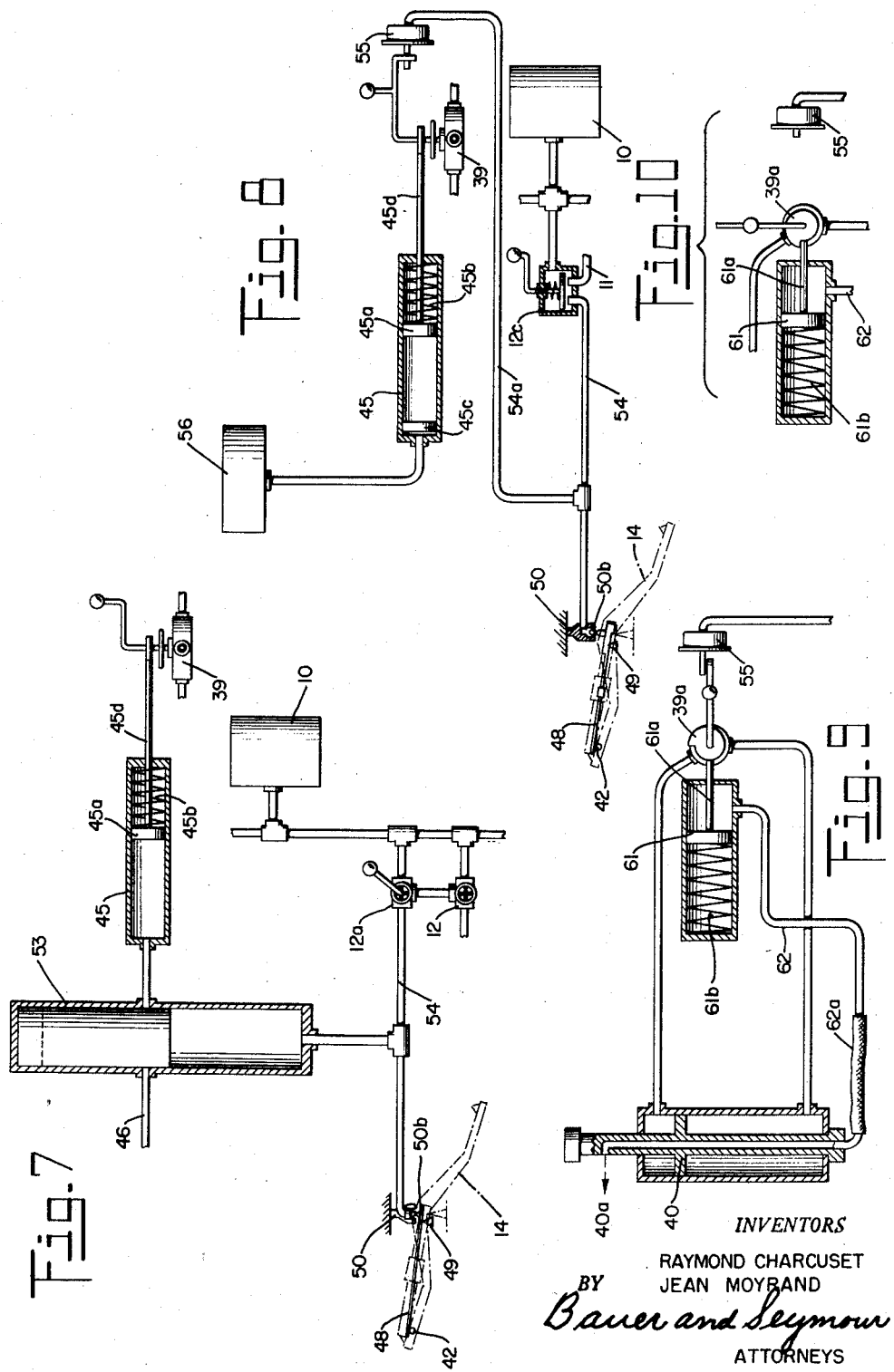

United States Patent Office 2,931,614
Patented Apr. 5, 1960

2,931,614

DEVICE FOR FILLING CONTAINERS WITH PREDETERMINED QUANTITIES OF MATERIALS

Raymond Charcuset, Chauny, and Jean Moyrand, Vaucresson, France, assignors to Societe Anonyme des Manufactures des Glaces et Produits Chimiques de Saint-Gobain, Chauny & Cirey, Paris, France Application August 14, 1956, Serial No. 603,919

Claims priority, application France August 17, 1955

20 Claims. (Cl. 249—64)

This present invention relates to a device for delivering given quantities of granular or powder materials, such device weighing the quantity of material both while it is being loaded into a container and after the container-filling operation.

The device in accordance with the invention comprises a hopper provided with a closing arrangement, and with a weighing arm provided at one of its extremities with a weight carrying mechanism and, at the other, with a holder for a container, such as a sack, placed beneath the closing arrangement. The weight carrying mechanism is operated automatically by means of compressed air or fluid under the control of a valve which in turn is controlled by the movement of the weighing arm in such manner that the hopper-closing means is in an open position when the arm is inclined towards the weight carrying mechanism and the hopper-closing means is closed when the arm lies in a position close to equilibrium, that is, a position corresponding to the introduction into the sack of a predetermined desired load of material.

The holding of the sack on the sack holder may, according to the invention, be effected by brackets or jaws controlled by a piston actuated by compressed air or by other fluid under pressure.

In accordance with one embodiment of the invention, the shutter which controls the opening and the closing of the hopper consists of a main large shutter and of an auxiliary small shutter. The shutters are so constructed and arranged that, in the course of a first phase of the cycle, the "pre-weighing" phase, the main shutter is wide open as long as the weighing arm is inclined in the direction of the weight carrying mechanism, the main shutter being closed as soon as a load of material closely approximating the desired load, but smaller than the desired load, has been introduced into the sack. During the next phase, designated the "finish-weighing" phase, the remainder of the material is introduced into the sack so that the desired amount is sacked. Such remainder of the material is introduced by means of the auxiliary shutter, which has but a small output capacity, and is operated by hand. The auxiliary shutter is manually closed when the arm reaches its position of equilibrium.

In accordance with another embodiment of the invention, an automatic compressed air control system is utilized to open to its maximum aperture the shutter of the hopper during the first "pre-weighing" phase, then partially to close the shutter at the end of the pre-weighing phase for purposes of "finish-weighing" and, finally to close the shutter completely at the end of this last phase, when the weighing arm has reached a position of equilibrium.

Further disclosed embodiments of the invention simplify the work of the operator, as by automatically locking the weighing arm after the completion of the weighing operation, and then automatically releasing the filled container such as a sack from the sack-holder on the weighing arm.

The invention has among its objects the provision of a novel apparatus for depositing predetermined weights of materials in containers.

A further object of the invention resides in the provision of a container filling apparatus, of the type indicated, wherein the filling operation proceeds initially at a fast rate and then at a slower rate as the delivered material approaches the predetermined weight of material desired.

Yet another object of the invention lies in the provision of such weighing apparatus wherein the shutter aperture is automatically varied as the container filling and material weighing operation proceeds.

A still further object of the invention lies in the provision, in apparatus of the type indicated, of mechanism automatically locking from operation the weighing device of the apparatus when the filling operation is finished, mechanism for then automatically releasing the filled container from the container holder on the weighing device, and mechanism for warning the operator if too great a weight of material has been delivered by the apparatus.

The invention will be more readily understood by reference to the accompanying drawings which illustrate non-limiting embodiments of the apparatus of the invention.

In the drawings, in the several figures of which the same reference characters are employed to designate the same parts:

Fig. 1 is a schematic vertical section of a semi-automatic material weighing and container device filling in accordance with a first embodiment of the invention.

Fig. 2 is a plan view detail, showing compressed air ducts leading to the weighing arm of the apparatus of Fig. 1.

Fig. 3 is a schematic view in section of a fully automatic material weighing and container filling device, in accordance with a second embodiment of the invention.

Fig. 4 is a schematic view in elevation of a detail of a modified weighing arm.

Fig. 5 is a fragmentary schematic view of mechanism which may be employed with the apparatus of Figs. 3 and 4 for automatically operating the control valve 39 thereof to lock the weighing arm and release the container from the weighing arm at the end of the material-delivering operation.

Fig. 6 is a fragmentary schematic view of another mechanism for performing generally the same functions as that of Fig. 5, the device of Fig. 6 employing a thermally operated relay to secure delayed actuation of the control mechanism.

Fig. 7 is a fragmentary schematic view of a third mechanism for performing generally the same functions as that of Fig. 5, the mechanism of Fig. 7 employing a fluid leakage device to secure delayed actuation of the control mechanism.

Fig. 8 is a fragmentary schematic view of mechanism which may be employed with the apparatus of Figs. 3 and 4 to interrupt the automatic functioning of the device if the material discharged into the container is incorrect.

Figs. 9 and 10 are schematic fragmentary views in different operating positions of a mechanism which may be employed with the apparatus of Figs. 3 and 4 for automatically operating the control valve 39 thereof in two distinct phases of its operating cycle.

Fig. 11 is a schematic fragmentary view in elevation of a safety mechanism which may be employed with the apparatus of Figs. 3 and 4 to lock control valve 39 thereof from operation when the weight of material delivered to the container exceeds the desired predetermined weight.

Fig. 12 is a schematic fragmentary view in elevation of a modified embodiment of the safety mechanism of Fig. 11.

In Fig. 1, 1 represents a material-delivering hopper which is closed by two shutter-wings 2 and 3, shutter 2 when open providing a large aperture of the hopper from A to B, and shutter 3, when open, permitting only a partial opening of the hopper, from B to C. Shutter 2 is controlled by a double action piston 6, acting through bell crank 4, 5. The cylinder containing piston 6 is connected by ducts 7 and 8 to a control valve represented schematically at 9.

Valve 9 may, in one position of its movable valve element (not shown), direct air under pressure from a compressor 10 into duct 7 and simultaneously connect duct 8 to the atmosphere. In the other position, the valve directs air into duct 8 and connects duct 7 to the atmosphere. The described shifing of the movable element of valve 9 is caused by admitting compressed air into conduit 11 by opening valve 12, which lifts the movable element of valve 9, and connecting duct 11 to the atmosphere by means of weighted valve 13, which causes said movable element of valve 9 to descend under the action of gravity. Valve 13 is closed when pressed forcibly downwardly by weight 16, but is open at other times.

Weighing arm 14 which consists of two parallel members 14a and 14b (Fig. 2) suitably connected, rests on two terminal fulcrums on axis 15a. The arm 14 is provided with two terminal supports on line 15b, on which rests the pivotally mounted weight or weight carrying device 16, and with two terminal supports on line 15c on which the container holding mechanism rests. These devices are symmetrical with respect to a vertical plane passing through the axis of supports 15c in order to avoid distortions in the structure perpendicular to such plane. The container or sack carrying arrangement consists of an arm 17 which holds a short vertical conduit 18; arm 17 also supports the sack holding mechanism which keeps the sack on the conduit 18. Such sack holding mechanism comprises two symmetrical pairs of articulated levers which control the holding-jaws 20a and 20b, such levers being actuated by two symmetrical, floating pistons provided with opposing springs. Fig. 1 shows one of the pairs of articulated levers 19a, 19b and one of the floating pistons 21 with its opposing spring 22.

In order that the mechanism feeding compressed air to pistons 21 shall have no effect on the balancing of the arm 14, such feed is effected in the manner illustrated in Fig. 2. The feed conduit 23, which is part of the fixed structure, is positioned in an alignment with central supports 15a. Receiving duct 24, which is part of the arm 14, is connected to the feed conduit 23 by means of a ball and socket joint schematically indicated at 25, such joint being placed in alignment with central supports 15a so as to insure the free rotation of the arm about the axis defined by the edge of central supports 15a. Conduit 24 is connected to a tube 26 which is also part of the arm 14, and is placed in alignment with supports 15c of the sack holder. This tube 26 is connected by means of flexible tubes not shown, to pistons 21.

The compressed air, fed through conduit 23 to those faces of pistons 21 which are opposite springs 22, causes jaws 20a, 20b of the sack holder to close. Admission of compressed air to conduit 23 is controlled manually by a valve 27. Such valve, depending upon its position, either directs compressed air to pistons 21 to close the jaws, or connects the cylinders containing these pistons to the atmosphere, thereby allowing the jaws to open by means of the action of the opposing springs 22.

The device of Figs. 1 and 2 functions as follows: Jaws 20a, 20b of the sack holder being open, a sack is placed about conduit 18 of the sack holder and said jaws are closed by directing compressed air to pistons 21 by manually operating valve 27. The sack being empty, weighing arm 14 is inclined with weight 16 down and the sack up. Weight 16 rests upon valve 13 in this position of the parts, thereby closing valve 13.

Valve 12 is then manually opened to admit compressed air to duct 11. Such compressed air, being unable to escape through valve 13, lifts the movable element of valve 9 to cause it to admit compressed air to duct 7 and at the same time to connect duct 8 to the atmosphere. This causes piston 6 to be moved downwards and opens shutter 2. The material to be sacked flows from the hopper into the sack; this progressively decreases the pressure of the weight carrying arrangement 16 on valve 13. When this pressure has decreased to a predetermined value corresponding, for instance, to the introduction into the sack of 95% of the total weight to be sacked, the movable element (not shown) of valve 13 rises sufficiently to connect conduit 11 to the atmosphere, thereby causing the movable element of valve 9 to descend. In this new position, the movable element of valve 9 connects conduit 7 to the atmosphere and duct 8 to the source of compressed air, thereby causing the movable element of valve 9 to descend. In this new position, the movable element of valve 9 connects conduit 7 to the atmosphere and duct 8 to the source of compressed air, thereby causing piston 6 to rise and immediately to close shutter 2. The operator then manually opens the auxiliary shutter 3, which permits feeding of the remainder of the material, now flowing at a small output rate, which is required to bring the contents of the sack to the desired value. When the arm 14 reaches a horizontal position, the operator closes shutter 3, and then, turning valve 27, connects conduit 26 to the atmosphere. The jaws of the sack carrying arrangement are thus opened, permitting the filled sack to fall.

Fig. 3 shows a device generally similar to that of Figs. 1 and 2, but having mechanism which not only automatically "pre-weighs" material as in the device of Figs. 1 and 2, but also automatically "finish-weighs" such material. The device shown in Fig. 3 moreover, comprises other improvements which will be set forth in the following description.

The loading hopper 1 is shut, in the embodiment of Figs. 3 and 4, by a flexible hose or sleeve 28, which may, for instance, be made of rubber, and which may be pressed inwardly so as to be closed or strangled by rollers 29a and 29b, which are controlled by levers 30a and 30b, mounted to rotate about axes 31a and 31b, respectively. Simultaneous closing or opening motion of levers 30a and 30b is effected by means of meshing part-gears 32a, 32b, gear 32a being part of a lever 33 controlled by double-acting piston 6. Piston 6 is connected, as in the embodiment of Figs. 1 and 2, to a control valve 9 cooperating with components 10, 11, 12, 13, which have already been described with reference to Fig. 1. The arm 14, the weight or weight carrying arrangement 16, and the sack holder 18, 19a, 19b, etc. are, in every respect, similar to those of Figs. 1 and 2.

The downward movement of piston 6 is limited by an opposing piston 34, which descends when the lower end of its cylinder is connected to the atmosphere. Piston 34 is raised when the lower end of its cylinder is connected with compressed air through conduit 47 by means of a valve 35 controlled by an electromagnet 36. The movement of the electromagnet 36 is controlled by a normally closed switch 37, the switch being opened by an adjustable stop 38 which is part of the weight carrying arrangement 16.

Manually operated valve 27 (of the embodiment of Figs. 1 and 2) is replaced by a valve 39 in the embodiment of Figs. 3 and 4, such valve 39 permitting the simultaneous feeding of compressed air to pistons 21 of the sack holder and to the lower part of a weighing arm-locking piston 40. Piston 40 is located above the weight carrying arrangement 16, and functions to lock arm 14 when such piston 40 lies in its lower position and to release the arm when the piston occupies its upper position. In another position, the valve 39 connects pistons 21 of the sack holder to the atmosphere and, concurrently, feeds compressed air to the upper part of piston 40 and connects the lower part of piston 40 to the atmosphere, thereby locking arm 14 with weight carrying device 16 in the lowered position.

The operation of the device of Figs. 3 and 4 is as follows: Fig. 3 shows the positions of the different components of the apparatus at the end of the material delivering and weighing operation. Equilibrium has been achieved, that is, arm 14 lies horizontal, the full sack is suspended on the sack holder, compressed air is still holding the jaws of the sack holder, the flexible sleeve or throat 28 is completely closed, and the pistons 6 and 34 are in their lowered position.

The operator then turns valve 39 through 90 degrees in a counterclockwise direction. This feeds compressed air to the upper face of piston 40, and connects the lower face of piston 40 to the atmosphere. The piston 40 thus descends and thereby causes the arm 14 to be locked with the bag or sack-holder side lifted and with the weight carrying arrangement lowered. Weight 16 then rests on valve 13, thereby closing such valve. The operator then turns valve 39 another 90 degrees counterclockwise. Pistons 21 are then connected to the atmosphere and the jaws of the sack holder accordingly open, letting the sack or bag fall. During the sack-releasing operation the arm 14 is locked by piston 40 in the above described position corresponding to the lowest position of the weight carrying arrangement.

The operator then positions an empty sack on the sack holder, and thereafter turns valve 39 through 180° in a clockwise direction. This causes the sack to be seized by the jaws of the sack holder. Concurrently, compressed air is sent back to the lower face of piston 40 which rises, thus freeing the arm 14 and causing contact 37 to engage stop 38. This last action cuts the electric power to the electromagnet 36, thereby allowing the movable element of valve 35 to fall, thus causing the lower face of piston 35 to be placed under pressure. The piston 34 is thus raised. By briefly opening valve 12, the operator places duct 11 under pressure, duct 11 being closed, as we have noted, by valve 13 which is held closed by the resting of weight carrying arrangement 16 upon it. The result is that the valve 9 releases piston 6 for upward travel. The latter is accordingly pushed upwards by piston 34 so as completely to open the flexible sleeve 28, thereby allowing rapid flow of the material in hopper 1 into the sack.

As the sack fills, the pressure of the weight carrying arrangement on valve 13 decreases. At a given moment, when the sack contains a weight of material slightly less than the desired weight, the spring (not shown) of valve 13 overcomes the force exerted by means 16 and the valve 13 then rises slightly, connecting duct 11 to the atmosphere. This allows the movable element of valve 9 to descend, and valve 9 in turn lowers piston 6. Before piston 6 reaches its lowest position, its piston rod encounters the end of opposing piston 34, which is then in a raised position. This causes the pressure rollers 29a and 29b to close sleeve 28 incompletely to form a partial aperture, permitting material in hopper 1 to keep flowing slowly into the sack. This partial aperture through sleeve 28 may be adjusted as required by the flow characteristics of the material to be sacked and to the precision required in the weighing, by adjusting the effective length of the rod of the piston 34 as by means of a threaded head 6a on such piston rod.

The weight of the delivered material accumulated in the sack finally equals the weight for which the device is adjusted, and the weighing arm 14 reaches its position of equilibrium. This movement, which lifts the weight carrying arrangement 16, concurrently lifts stop 38 out of engagement with switch 37. Switch 37 then closes the feeding circuit for electromagnet 36, the movable element of valve 35 is lifted and pressure is released from piston 34. The latter descends, leaving piston 6, still under pressure, to descend quickly to its lowest position, which corresponds to the total closure of the sleeve 28. The sack then contains the desired quantity of material and the cycle may begin once more.

It is to be noted that during its free fall from the hopper into the same, the material acquires a certain amount of momentum which might yield misleading results during the weighing. In order to remedy this difficulty, the flexible sleeve 28 is made long enough to be introduced into conduit 18 of the sack-holder, thereby decreasing the level differential between the material located in the lower part of the hopper and that material which is in the sack. In the case of the apparatus shown on Fig. 1, it is not possible to have the orifice of the hopper penetrate into the frame of the sack-holder, but the difficulty hereinabove described may, nevertheless, be overcome by the mechanism shown in Fig. 4.

Figure 4 shows an arm 14 to which an elongated slider 41 is attached. Slider 41 rests at one end on a stop 42, which is part of the arm, and at its other end on the central pivotal support 15a for the arm 14. Slider 41 carries weight 43 which can be moved along the slider. Weight 43, in effect, causes an overweighting of the arm 14 on the same side as the sack holder, such overweighting being adjustable at will and permitting compensation for the momentum of the falling material. In order that the action of weight 43 may be terminated when the arm 14 arrives close to its position of equilibrium, there is provided an adjustable stop 44 which is part of the frame structure of the device. Slider 41 comes to a stop against means 44 when arm 14 approaches a horizontal position. In this manner, slider 41 can not weigh down the arm 14 in its position of equilibrium, thus rendering precise weighing possible. The arrangement of Fig. 4 may be advantageously used in the device shown in Fig. 3.

In Fig. 5 there is shown a control system which may be incorporated in the apparatus of Fig. 3 to render easier the operation of such apparatus. Fig. 5 shows a cylinder 45, containing a piston 45a, which is connected via duct 46 with a source of compressed air fed through conduit 47. Piston 45a is also subjected to the action of an opposing spring 45b. Piston 45a is connected by a flexible linkage 45d to valve 39, so as to cause the rotatable element of the valve to pivot in a counterclockwise direction when the piston 45a is moved from right to left by the action of the spring 45b. The movable element of valve 39 is initially turned counterclockwise manually to start the operation of the device. During the entire pre-weighing phase and during the finish weighing phase, conduit 47 is under pressure as we have seen in considering Fig. 3. This keeps opposing piston 34 raised; consequently, piston 45a is also under pressure with concurrent compression of spring 45b, so that piston 45a does not then act on valve 39. At the end of the weighing, duct 47 is released (i.e. connected to the atmosphere) to permit opposing piston 34 to descend and to completely close jaws 29a and 29b; this causes duct 46 and cylinder 45 also to be released, which permits piston 45a, pushed back by the action of the spring 45b, to cause the movable element of valve 39 to be turned clockwise to its initial position.

Figs. 6 and 7 show devices somewhat similar to that of Fig. 5, but incorporating means permitting actuation of piston 45a only after arm 14 has become stabilized in its equilibrium position. In Fig. 6 a time delay relay is employed, the relay being actuated by a slider device somewhat similar to that which is schematically shown in Fig. 4.

The mechanism of Fig. 6 comprises a slider 48, mounted on a pivoting support 49 which is a part of the frame. Slider 48 rests, when the arm is in a position of equilibrium, on a stop 50. Slider 48 is maintained in a raised position by stop 42 (Fig. 4) when a position of equilibrium of arm 14 has not been achieved. An electric contact 50a, placed on stop 50, acts to energize the heating coil of a thermally operated relay 51. Relay 51 operates an electrically actuated valve 52 positioned in duct 46. Valve 52 is so constructed that it connects cylinder 45 to the atmosphere via ducts 46 and 47 only when said valve 52 is lifted by the operation of thermally operated relay 51.

When the weighing operation is terminated, as above described, if the weight of the sack is correct, arm 14 is horizontal and slider 48 pushes on stop 50, thereby closing contact 50a and energizing the heating coil of relay 51. After a period of time, controlled by the relay 51, valve 52 is shifted so as to vent cylinder 45; this causes the locking of the arm 14 in the dash line position shown in Fig. 6, and the consequent release of the sack. In the absence of mechanism such as shown in Fig. 6 (or in Fig. 7, to be described) if, for any reason, for instance for reasons of external influence, the arm 14 were to oscillate to the position of equilibrium without coming to rest there, the finish-weighing arrangement would be excited before the real weight of the sack had become equal that of the desired weight. When the apparatus is provided with a device such as shown in Fig. 6, however, if the arm 14 has not become stable in its horizontal position of equilibrium, slider 48 will not have permanently come to rest on stop 50. Contact 50 will, therefore, function only for a short period which is insufficient to cause relay 51 to actuate the electro-valve 52. Thus the sack remains suspended until it has been completely filled. Any method of signalling may be provided with this device. Thus the device of Fig. 6 may be employed to warn the operator by either sound or light signals when the arm 14 has, or has not, become stabilized at its equilibrium position.

In Fig. 7 there is shown a mechanism in which the desired time delay is effected by the slow leakage of fluid. A valve 53 connects duct 46 with cylinder 45 when the movable element of the valve 53 is in a depressed position, and disconnects cylinder 45 from the duct 46 when such movable element is in a raised position. A quick-venting valve 12a, twin to valve 12 and positioned on the main duct channelling compressed air from the compressor 10, sends fluids by way of duct 54 which raises the movable valve element in valve 53. The movable element of valve 53 maintains itself in this position and isolates cylinder 45, as long as the slow discharge valve 50b is not raised by the pivoting of the slider 48, for a period of time which suffices for the evacuation of the air in valve 53 which maintains the movable element of valve 53 in its raised position. The movable valve element then drops, and the apparatus functions to drop the filled sack.

The weight of filled sacks may be controlled by a locking system which blocks the automatic operation of the device if the weight is not correct. Such locking system is illustrated in Fig. 8. A double acting poppet valve 12c is positioned on the main compressed air duct 10, permitting compressed air feed of the pre-weighing circuit by means of duct 11, as in the apparatus of Fig. 3. A pneumatic lock 55 is connected to duct 54 by a branch line 54a. Lock 55 immobilizes valve 39 as long as the slow discharge valve 50b on stop 50 is not maintained in a lifted position for a predetermined period by the pivoting of the control slider 48. The return of valve 39, under the influence of the spring 45b on piston 45, may be slowed by the leakage of fluid through a retention valve 45c into storage means 56. The mechanism of Fig. 8 is capable of operating to advantage with a fluid denser than air, for instance oil.

The control mechanism shown in Figs. 9 and 10 provides for the actuation of valve 39 through two quite distinct phases. The mechanism consists of a single action pneumatic piston 61, the stem of which acts on a cam part 39a mounted to rotate with the movable element of valve 39. The movement of piston 61 is controlled by that of piston 40 (Fig. 3). Fig. 9 shows the mechanism during the weighing operation. Cylinder 61 has been vented to the atmosphere by duct 62, flexible conduit 62a, and aperture 40a through the rod of piston 40. The shaft of the piston 61 is maintained in contact with cam 39a by the action of spring 61b. Consequently, valve 39, when released by lock 55, will only be able to go through one quarter turn and will be locked in the position shown in Fig. 10. When valve 39 is in this position, it reverses the direction of pressure fed to piston 40, and releases such piston so that it can move downwardly. At the lower end of the motion of piston 40 aperture 40a lies within the cylinder containing piston 40. Thus fluid under pressure from aperture 40a is then led by duct 62 to chamber 61a. Piston 61 then depresses the spring 61b and retracts the rod of piston 61 from cam 39a. Valve 39 may then continue with its rotation of 90° which permits the jaws 20a, 20b to open and the full sack to be released.

The handle of poppet valve 12c (Fig. 8) may be arranged so as to constitute a stop for the handle of valve 39, in the rotation of the latter clockwise through 180°. This arrangement permits valve 12c to act only pursuant to the manual opening of valve 39. Under such circumstances, a single motion by the operator, to wit: the rotation of the said valve 39 clockwise through 180°, suffices to start the entire weighing process.

As described with respect to Figs. 6 to 10, the safety mechanisms block valve 39 if the weight of the sack is insufficient. They do not, however, alert the operator if, for some reason, an error of the opposite type occurs, i.e. if the weight is greater than that provided for. The mechanism described hereinbelow with reference to Fig. 11 overcomes this difficulty. The mechanism of Fig. 11 is disclosed as incorporated in the control device of Fig. 8. As shown in Fig. 11, a slider 57 is pivoted about a support 57a mounted on the frame. A knife edge 57b on slider 57 presses on one arm of slider 48. A weight 48a utilized for compensation purposes, may be moved on the other arm of slider 48, permitting close tolerance adjustments of the inertia of the system. The other end of slider 57 is provided with a float spindle 57c which may, in due course, press on stop 58 of the weight carrying mechanism 16. Fig. 11 shows the arm 14 in a position of equilibrium. When an excessive weight of material in the sack causes the arm to leave said position of equilibrium, the weight carrying arrangement is lifted abnormally. Stop 58 then presses on the float spindle 57c, causing slider 57 to pivot counterclockwise. This causes slider 58 to pivot clockwise, which forces the withdrawal of abutment 48b from contact with valve 50b on stop 50, whereupon since the air of duct 54 is unable to escape, lock 55 is made to block valve 39 (Fig. 8).

It is evident that the mechanism of Fig. 11, with obvious appropriate changes, may be incorporated into the system of Fig. 7 to control valve 53, or may be employed to control the valve 52, by way of control 53, or may be employed to control the valve 52, by way of contact 50a, in the system of Fig. 6.

In Fig. 12 there is shown a variation of the mechanism of Fig. 11. Slider 59 rests on a fixed support 60 mounted on the frame of the device, and acts on slider 48 by means of a float spindle 59b. When at rest, the head of spindle 59b serves as a stop and reposes on the frame of the device. If the arm 14 leaves the normal position of equilibrium due to overweight of the container, the stop 42 on the arm 14 in descending takes along slider 59. This causes slider 48 to pivot and completely withdraws float spindle 48b from poppet valve 50b, thereby to cause lock 55 to block valve 39, in the same manner as in the mechanism of Fig. 11. Fig. 12 shows the control mechanism during the filling of a sack, slider 48 resting on stop 42 on arm 14, and spindle 48b being spaced from poppet valve 50b.

What is claimed is:

1. An apparatus for filling a container with a predetermined weight of a fluent material, which comprises a pivoted weighing arm, a weight carrying device carried on one end of said arm, a container holder carried on the other end of said arm, a fluent material delivering conduit having a shutter device mounted above the container holder, means for moving the shutter between open and closed positions, a fluid system including a control valve for controlling the last named means, said fluid system including a bleeder valve responsive to the positioning of the weighing arm, the apparatus being so constructed and arranged that the bleeder valve is closed to place the fluid system under pressure and the shutter device is open when the weighing arm is inclined downwardly toward the weight carrying device, and the bleeder valve is open to relieve the pressure in the fluid system and close the shutter when the weighing arm lies in a position close to horizontal.

2. The apparatus as set forth in claim 1, in which there is a fluid pressure operated container-suspending means on the weighing arm, a fluid pressure operated weighing arm blocking means selectively to hold the weight carrying device in a downward position, and a control valve for simultaneously releasing the container suspending means and blocking the weighing arm.

3. The apparatus as set forth in claim 1, in which there is a second fluid operated means which selectively opposes movement of the means for moving the shutter between open and closed positions, said second means when energized permitting movement of the shutter moving means only to partially open position, and the fluid system includes means for simultaneously energizing the second fluid operated means and energizing the shutter moving means in the shutter-closing direction upon the opening of the bleeder valve.

4. The apparatus as set forth in claim 3, in which there is a fluid pressure operated container suspending means on the weighing arm, a fluid pressure operated weighing arm blocking means selectively to hold the weight carrying device in a downward position, and a control valve for simultaneously releasing the container suspending means and blocking the weighing arm.

5. The apparatus as set forth in claim 4, in which the weighing arm blocking means includes a normally closed switch which is opened when the weighing arm is in blocked position, said switch being in a circuit which controls the fluid operated means for opposing closing of the shutter, said parts being so constructed and arranged that said fluid operated means which opposes closing of the shutter is de-energized to allow closing of the shutter when the weighing arm is in equilibrium and the switch is closed.

6. The apparatus as set forth in claim 1, in which the container is a sack depending from the container holder, the sack is held on the container holder by releasable external jaws gripping the upper end of the sack, and the jaws are selectively opened and closed by fluid operated mechanism.

7. The apparatus as set forth in claim 6, in which the fluid operated mechanism is supported on the weighing arm, and a fluid feed conduit for such mechanism includes one conduit portion mounted on the arm, and another conduit portion mounted externally of the arm, and a pivotal fluid conducting joint connecting the two portions of the conduit and aligned with the pivotal axis of the weighing arm.

8. The apparatus as set forth in claim 1, comprising a second fluid operated means which when energized stops closing movement of the shutter with the shutter in a partially opened position and when de-energized allows closing of the shutter, means on the weighing arm for selectively gripping and releasing the container, a manually movable device for controlling the last named means, means to de-energize the second fluid operated means when the weighing arm is in equilibrium, and means for automatically returning the control device to starting position after the conclusion of the material weighing operation, including a fluid motor connected in parallel with the second fluid operated means.

9. Apparatus as set forth in claim 8, in which there is a means which operates a predetermined time after its energization for exhausting the fluid motor, and means responsive to the positioning of the weighing arm at equilibrium for initiating operation of said last named means.

10. Apparatus as set forth in claim 9, in which the means for exhausting the fluid motor is a thermally operated exhaust valve, the weighing arm includes a slider which pivots free of the weighing arm at the equilibrium position of the latter, and the slider closes a circuit to energize the thermally operated exhaust valve at equilibrium of the weighing arm.

11. Apparatus as set forth in claim 9, in which the means for exhausting the fluid motor includes a fluid actuated exhaust valve connected to the fluid motor, said exhaust valve having a cylinder and piston arrangement which closes the exhaust valve when the cylinder is under pressure, the weighing arm includes a slider which pivots free of the weighing arm at the equilibrium position of the latter, and the slider opens an escape valve to release fluid from the cylinder and thus opens the exhaust valve after a predetermined time delay.

12. Apparatus as set forth in claim 9, in which there is means for automatically returning the control device to starting position including a means constantly biasing the control device toward starting position and time delay mechanism acting in opposition to the biasing means, a fluid operated lock device for retaining the control device in operating position when the second fluid operated means is energized, and means operative when the weighing arm reaches equilibrium for de-energizing the lock device to release the control device, thereby to allow the control device to be returned to starting position by the time delay mechanism.

13. Apparatus as set forth in claim 1, comprising a compensating device which adds a predetermined effective weight to the container holding side of the weighing arm in a first position of the weighing arm in which the weight carrying side of the arm is inclined downwardly and which removes such effective weight from the weighing arm when the weighing arm is in a second position approaching equilibrium.

14. Apparatus as set forth in claim 13, in which the compensating device comprises a slider arm which rests upon the central pivot for the weighing arm and a cross support on the container holding end of the weighing arm in said first position of the latter, and which is held free of the weighing arm in said second position of the latter.

15. An appartus as set forth in claim 1, comprising means responsive to inclination of the weighing arm with the container carrying end downward to lock the means for controlling the shutter device from operation.

16. The apparatus as set forth in claim 15, comprising a valve, a spring for controlling the valve, a cam on the valve, and pneumatic means controlled by a piston forming a mobile stop above the weight carrying arm for returning the valve in two distinct phases.

17. The apparatus as set forth in claim 16, wherein the valve is a poppet valve and comprising a stop limiting the rotation of the valve so that the valve acts only upon the manual opening thereof.

18. The apparatus as set forth in claim 16 comprising safety means which blocks the valve if the weight of the filled sack exceeds a predetermined value.

19. The apparatus as set forth in claim 18, wherein the safety means comprises two sliders, a first one of said sliders being controlled by the weighing arm, said first slider acting on the second slider when the weighing arm and the weight carried thereby are lifted abnormally, and a fluid system operated by the second slider which blocks the operation of the weighing device.

20. An apparatus for filling a container with a predetermined weight of a fluent material, which comprises a pivoted weighing arm, a weight carrying device carried on one end of said arm, a container holder carried on the other end of said arm, a fluent material delivering conduit having a shutter device mounted above the container holder, means for moving the shutter between open and closed positions, a fluid pressure operated weighing arm blocking means selectively to hold the weight carrying device in a downward position, a fluid system including a control valve for controlling the shutter and the arm blocking means, means operated by fluid pressure in said system for locking the control valve in shutter-opening position and for unlocking the valve upon release of fluid pressure in said system, means operative upon unlocking the control valve temporarily to maintain it in a mid-position to de-energize the arm blocking means, and means operative when the weighing arm has been fully released by the arm blocking means to release the control valve from its mid-position to allow it to be turned to its starting position.

References Cited in the file of this patent

UNITED STATES PATENTS

| | | |
|---|---|---|
| 2,160,746 | Low | May 30, 1939 |
| 2,340,531 | Howard | Feb. 1, 1944 |
| 2,544,734 | St. Clair | Mar. 13, 1951 |
| 2,632,589 | Rowland | Mar. 24, 1953 |
| 2,860,848 | Weaver et al. | Nov. 18, 1958 |